US012575987B2

(12) United States Patent
Uchiyama

(10) Patent No.: US 12,575,987 B2
(45) Date of Patent: Mar. 17, 2026

(54) SIMPLIFIED EXAMINATION ROOM AND SIMPLIFIED EXAMINATION ROOM ASSEMBLY SET

(71) Applicant: Junzo Uchiyama, Atsugi (JP)

(72) Inventor: Junzo Uchiyama, Atsugi (JP)

( * ) Notice: Subject to any disclaimer, the term of this patent is extended or adjusted under 35 U.S.C. 154(b) by 1197 days.

(21) Appl. No.: 17/496,455

(22) Filed: Oct. 7, 2021

(65) Prior Publication Data

US 2022/0117817 A1    Apr. 21, 2022

(30) Foreign Application Priority Data

Oct. 19, 2020    (JP) .................................. 2020-175405

(51) Int. Cl.
| | |
|---|---|
| *A61G 10/00* | (2006.01) |
| *A61G 10/02* | (2006.01) |
| *B25J 21/02* | (2006.01) |

(52) U.S. Cl.
CPC ......... *A61G 10/005* (2013.01); *A61G 10/023* (2013.01); *B25J 21/02* (2013.01); *A61G 2203/70* (2013.01)

(58) Field of Classification Search
CPC ................ A61G 10/005; A61G 10/023; A61G 2203/70; B25J 21/02
USPC ..................................................... 600/21–22
See application file for complete search history.

(56) References Cited

U.S. PATENT DOCUMENTS

| | | | | | |
|---|---|---|---|---|---|
| 3,802,416 | A | * | 4/1974 | Cazalis ................ | A61G 10/005 600/21 |
| 6,461,290 | B1 | * | 10/2002 | Reichman ............ | A61G 10/005 5/6 |
| 10,302,318 | B1 | * | 5/2019 | Chambers ............... | F24F 3/167 |

(Continued)

FOREIGN PATENT DOCUMENTS

| | | |
|---|---|---|
| CN | 210947910 U | 7/2020 |
| JP | 2011-229696 A | 11/2011 |

(Continued)

OTHER PUBLICATIONS

COVID-19 Special: Silver lining in business—Medtech &pharmaceuticals. Home-grown firms linked to pandemic work will continue to attract demand, investments. Audrey Tan, May 10, 2020. The Straits Times (see attached) (Year: 2020) (Year: 2020).*

(Continued)

*Primary Examiner* — Sunita Reddy
(74) *Attorney, Agent, or Firm* — Oliff PLC

(57) ABSTRACT

A simplified examination room includes a first booth and a second booth provided adjacent to each other, interposing a partition wall therebetween, and the partition wall is formed with a through hole allowing an arm to pass through and is provided, at least at an intermediate portion of the partition wall in an up-down direction, with a transparent region allowing a person having entered the first booth and a person having entered the second booth to face each other. A simplified examination room assembly set for producing the simplified examination room includes a frame constituting a framework of the first booth and the second booth, and a (Continued)

panel constituting at least one side of a ceiling part, a floor part, a side face wall, or a back face wall, and a partition wall partitioning the first booth and the second booth.

20 Claims, 7 Drawing Sheets

(56)                   References Cited

U.S. PATENT DOCUMENTS

| | | | |
|---|---|---|---|
| 2006/0217789 A1* | 9/2006 | Perez | A61N 5/0616 |
| | | | 607/94 |
| 2011/0285257 A1* | 11/2011 | Sheldon | B25J 21/02 |
| | | | 16/2.2 |
| 2012/0136196 A1* | 5/2012 | Foxall | G01R 33/3802 |
| | | | 324/318 |
| 2016/0136024 A1* | 5/2016 | Poenisch | A61G 7/0005 |
| | | | 600/21 |
| 2020/0340945 A1* | 10/2020 | Abdolahad | G01N 27/3275 |
| 2021/0016216 A1* | 1/2021 | Popa-Simil | F24F 3/167 |
| 2021/0236366 A1* | 8/2021 | Serrano | A61G 10/023 |
| 2021/0307988 A1* | 10/2021 | Benes | E04H 3/08 |
| 2021/0353794 A1* | 11/2021 | Popa-Simil | F24H 3/002 |
| 2022/0331181 A1* | 10/2022 | Song | A61G 10/023 |

FOREIGN PATENT DOCUMENTS

| | | | | |
|---|---|---|---|---|
| KR | 10-1674482 B1 | 11/2016 | | |
| WO | WO-2021246991 A1 | * | 12/2021 | F24F 3/163 |

OTHER PUBLICATIONS

Esco Aster Gathers Key Collaborators to Advance MobileDiagnostic Labs Aster Xpress™ in Singapore and Globally, May 18, 2020, Esco Aster News & Events(see attached) (Year: 2020).*

Covid-19 Mass Screening Swab Booth at Gleneagles Hospital. The Straits Times, Jun. 9, 2020. URL: <https://www.youtube.com/watch?v=x1hr2sS46iM>.

* cited by examiner

SIMPLIFIED EXAMINATION ROOM AND SIMPLIFIED EXAMINATION ROOM ASSEMBLY SET

BACKGROUND

Technical Field

The present invention relates to an examination room having a simplified structure and relates to, in particular, a simplified examination room capable of quickly and safely performing an examination or the like on a patient with an infectious disease or a patient suspected of having an infectious disease, and a simplified examination room assembly set.

Related Art

When performing medical treatment, such as an examination or a test, on a patient with an infectious disease or a patient suspected of having an infectious disease, a medical worker has worn protective clothing and an N95 mask (hereinafter, also referred to as protective clothing and the like) in order not to receive droplets from the patient.

However, the protective clothing and the like cannot be reused, and it is necessary to remove and discard the protective clothing and the like worn when an examination or the like for a patient is completed. Thus, if an infectious disease spreads and a large number of patients are examined, protective clothing and the like can become insufficient. In addition, in order to strictly prevent infection, protective clothing and the like must be very carefully put on and taken off, and a wearer requires a lot of labor. In addition, protective clothing has a structure that prevents the skin from exposing to droplets and contaminated air, and thus has poor air permeability and tends to retain heat. Thus, there is a concern that the wearer's physical strength is exhausted.

In contrast, JP 2011-229696 A proposes a pathogen infection prevention system for preventing a pathogen generated from a patient from infecting a medical worker without wearing an N95 mask.

In the pathogen infection prevention system, an examination room is separated into a clean area and a contaminated area by a suspended partition. The clean area includes a supply opening from which clean air is supplied, and is a space for a medical worker to sit. On the other hand, the contaminated area includes a suction opening for discharging the contaminated air to the outside, and is a space for the patient to sit. The lower end position of the partition is adjusted to a height about plus or minus 20 cm of the mouth of the patient in the contaminated area. The air supplied to the clean area flows into the contaminated area and is discharged from the suction opening. It is described that, with the system, the pathogen concentration in the respiration area of the medical worker in the clean area can be equal to or less than the concentration when an N95 mask is worn.

SUMMARY

The above pathogen infection prevention system can be effective for airborne infection at the time of an examination but has a problem in that droplet infection and contact infection from a patient is not sufficiently taken into consideration.

That is, if the partition between the medical worker and the patient has a height plus or minus 20 cm of the mouth of the patient, it is unavoidable that droplets of the patient adhere to the face of the medical worker, clothing, or the like. Splashing droplets on a floor face and the like of the clean area can contaminate the clean area. Viruses and bacteria (hereinafter, also referred to as viruses and the like) contained in droplets adhering to clothing, the floor face, and the like survive for a certain period of time. Thus, viruses and the like adhering to clothing, soles of shoes, and the like can be indirectly brought into contact with the mouth, eyes, and the like and enter the body.

For this reason, it has been desired to provide an examination room taking droplet infection countermeasures and contact infection countermeasures as well as airborne infection countermeasures into sufficient consideration.

The present invention has been made in view of the above problems. That is, the present invention is to provide a simplified examination room and a simplified examination room assembly set taking droplet infection countermeasures and contact infection countermeasures as well as airborne infection countermeasures into sufficient consideration.

A simplified examination room of the present invention includes a first booth and a second booth provided adjacent to each other, interposing a partition wall therebetween, the partition wall formed with a through hole allowing an arm to pass through and provided, at least at an intermediate portion of the partition wall in an up-down direction, with a transparent region allowing a person having entered the first booth and a person having entered the second booth to face each other.

A simplified examination room assembly set for producing the simplified examination room of the present invention includes a frame constituting a framework of the first booth and the second booth, a panel constituting at least one side of a ceiling part, a floor part, and a side face wall, or a back face wall, and a partition wall partitioning the first booth and the second booth.

A simplified examination room of the present invention is partitioned, by a partition wall provided with a through hole, into a first booth which a medical worker enters and a second booth which a patient enters. Thus, since air hardly circulates between the first booth and the second booth, it is possible to prevent airborne infection and also prevent droplets of the patient from splashing into the first booth. In an environment in which airborne infection and droplet infection are prevented as described above, it is possible for a medical worker to safely perform an examination, a test, treatment, or the like on the facing patient with the arm passing through the through hole provided in the partition wall.

In addition, a simplified examination room assembly set of the present invention enables easy and quick construction of the simplified examination room of the present invention.

DETAILED DESCRIPTION

Figure 1:
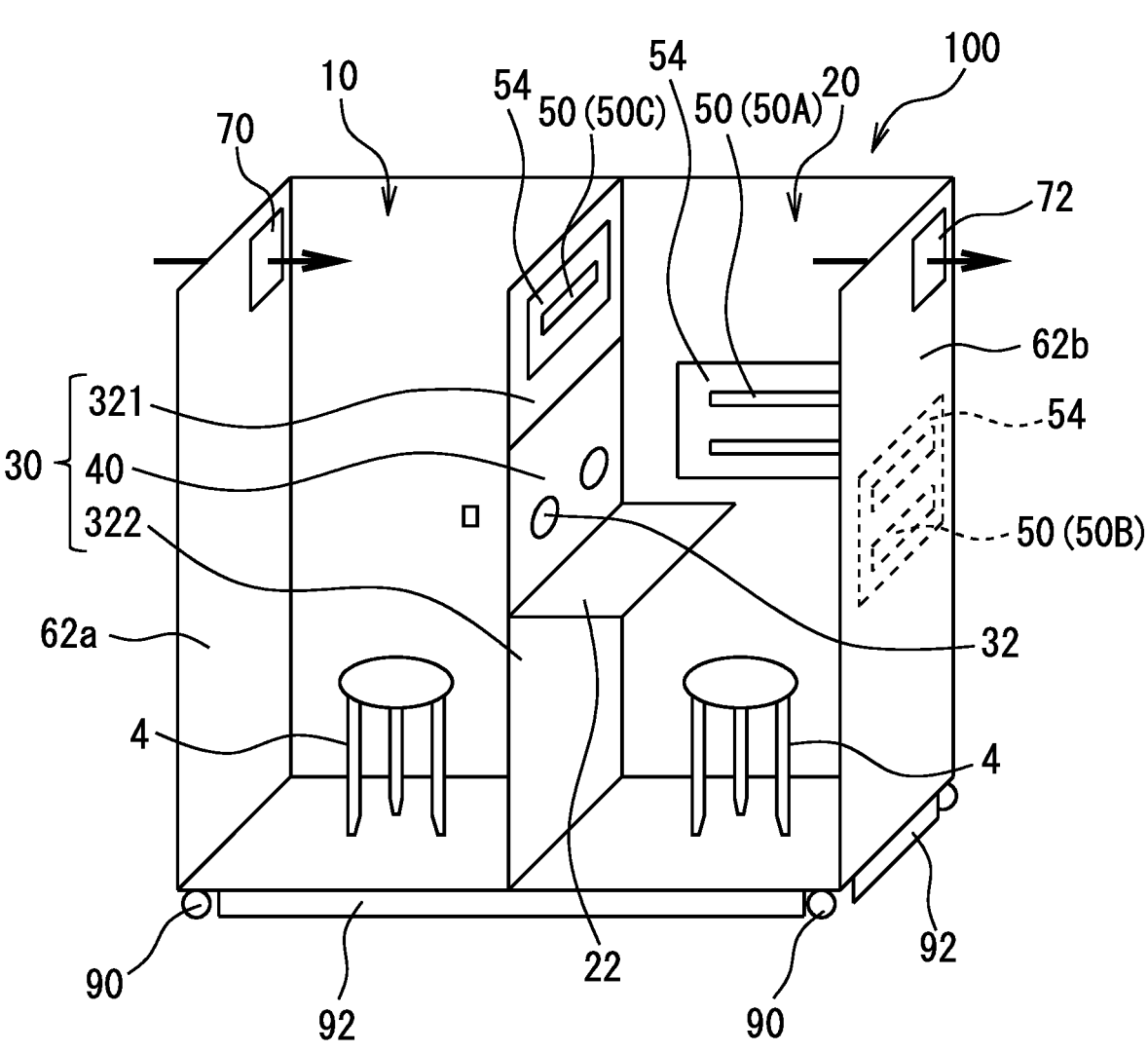
FIG. 1 is a schematic perspective view of the inside of an entire simplified examination room according to an embodiment of the present invention.
Figure 2:
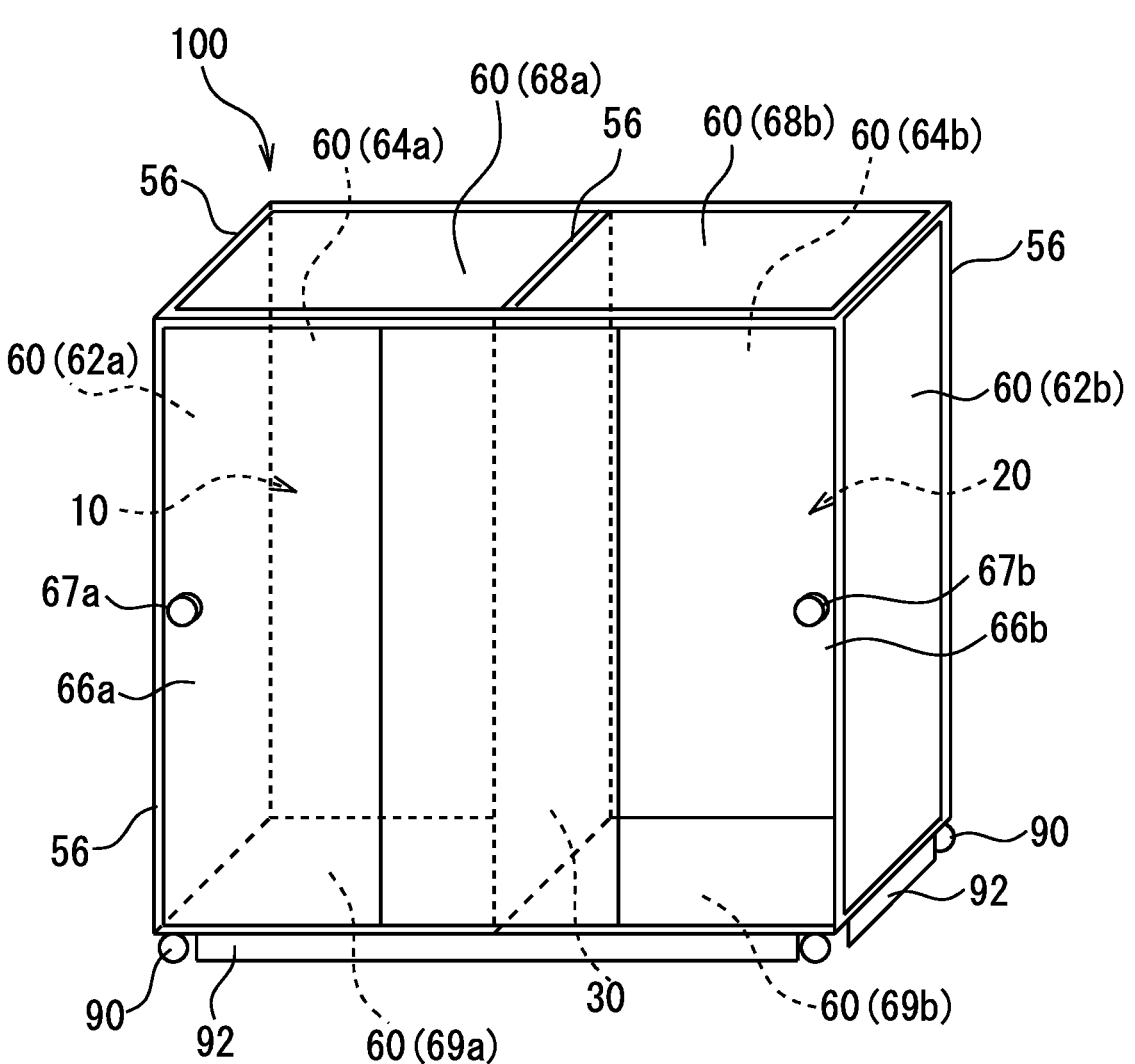
FIG. 2 is a schematic perspective view of an external appearance of the simplified examination room according to the embodiment of the present invention.
Figure 3:
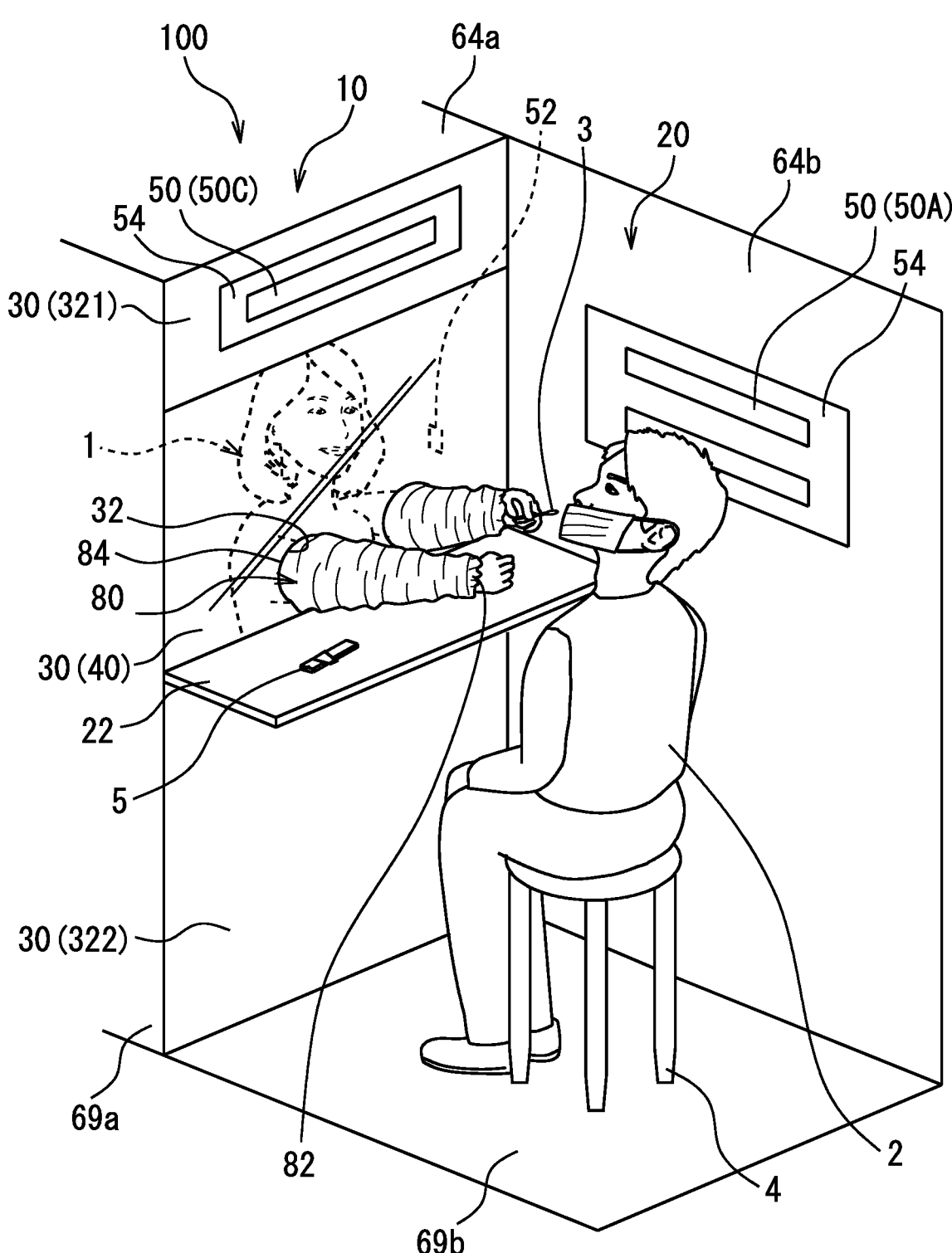
FIG. 3 is a schematic perspective view of the inside of a part of the simplified examination room according to the embodiment of the present invention.
Figure 4:
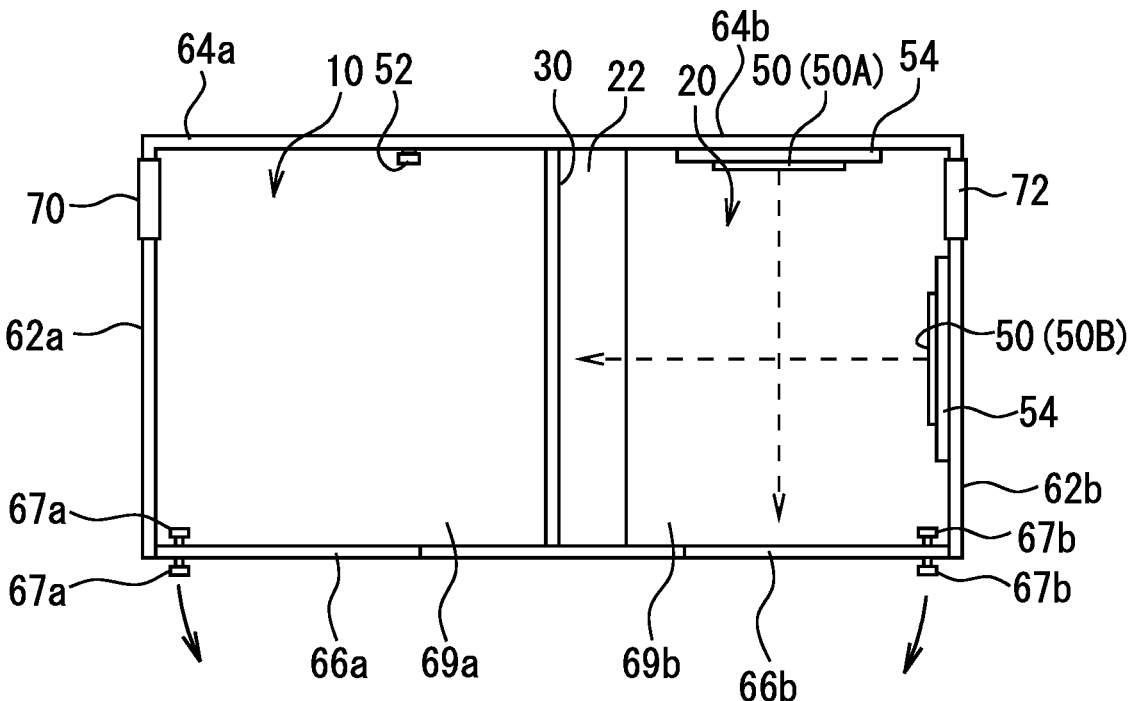
FIG. 4 is a top view of the inside of the entire simplified examination room according to the embodiment of the present invention.
Figure 5:
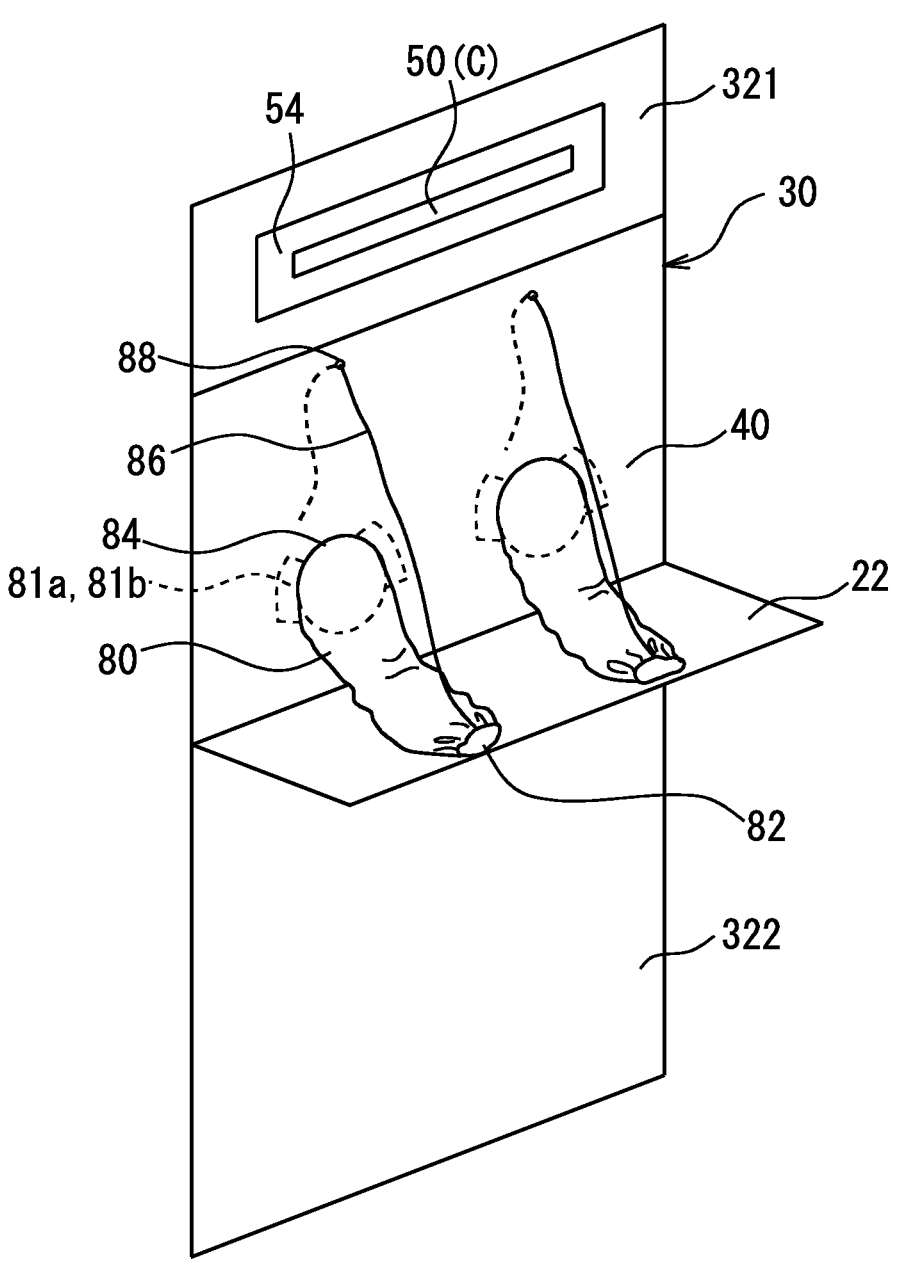
FIG. 5 is a perspective view of a partition wall as viewed from a second booth side provided in the embodiment of the present invention.
Figure 6:
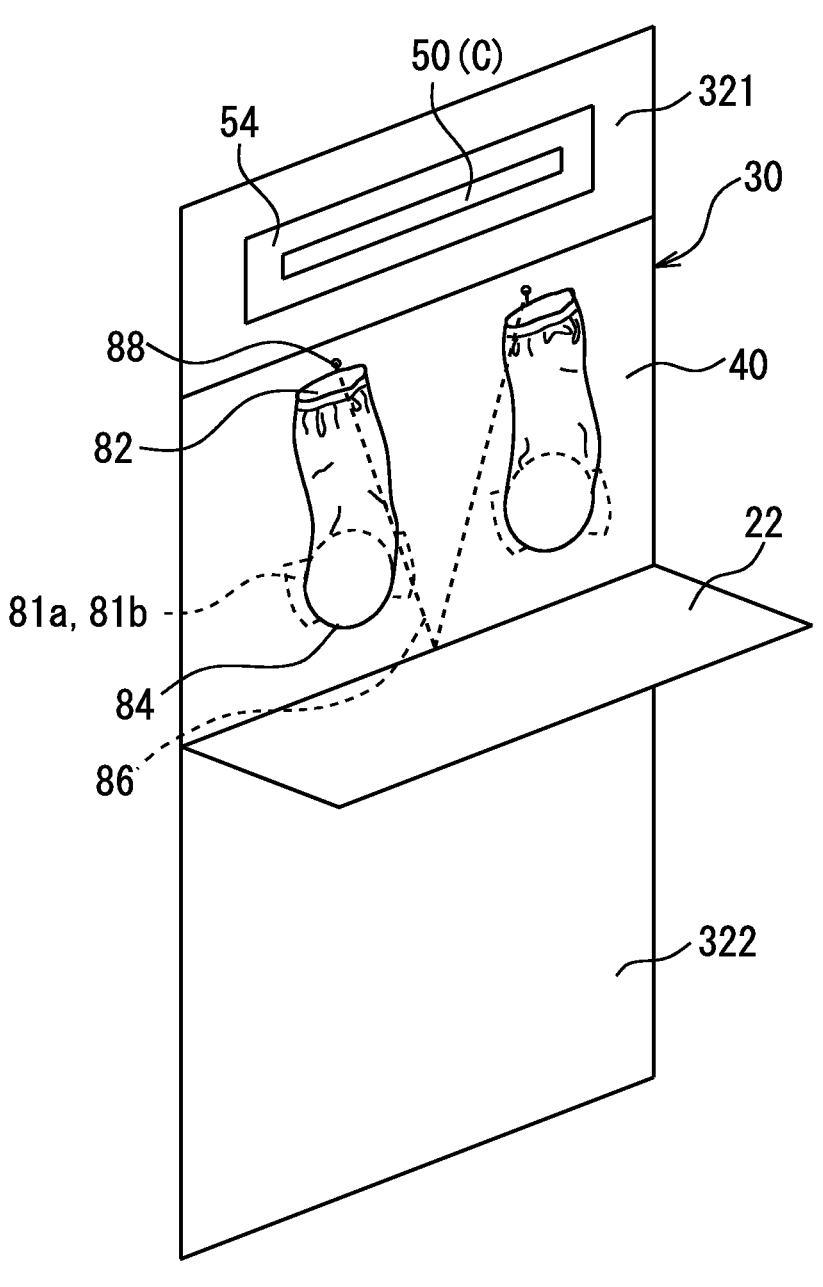
FIG. 6 is a perspective view of the partition wall as viewed from the second booth side provided in the embodiment of the present invention.
Figure 7:
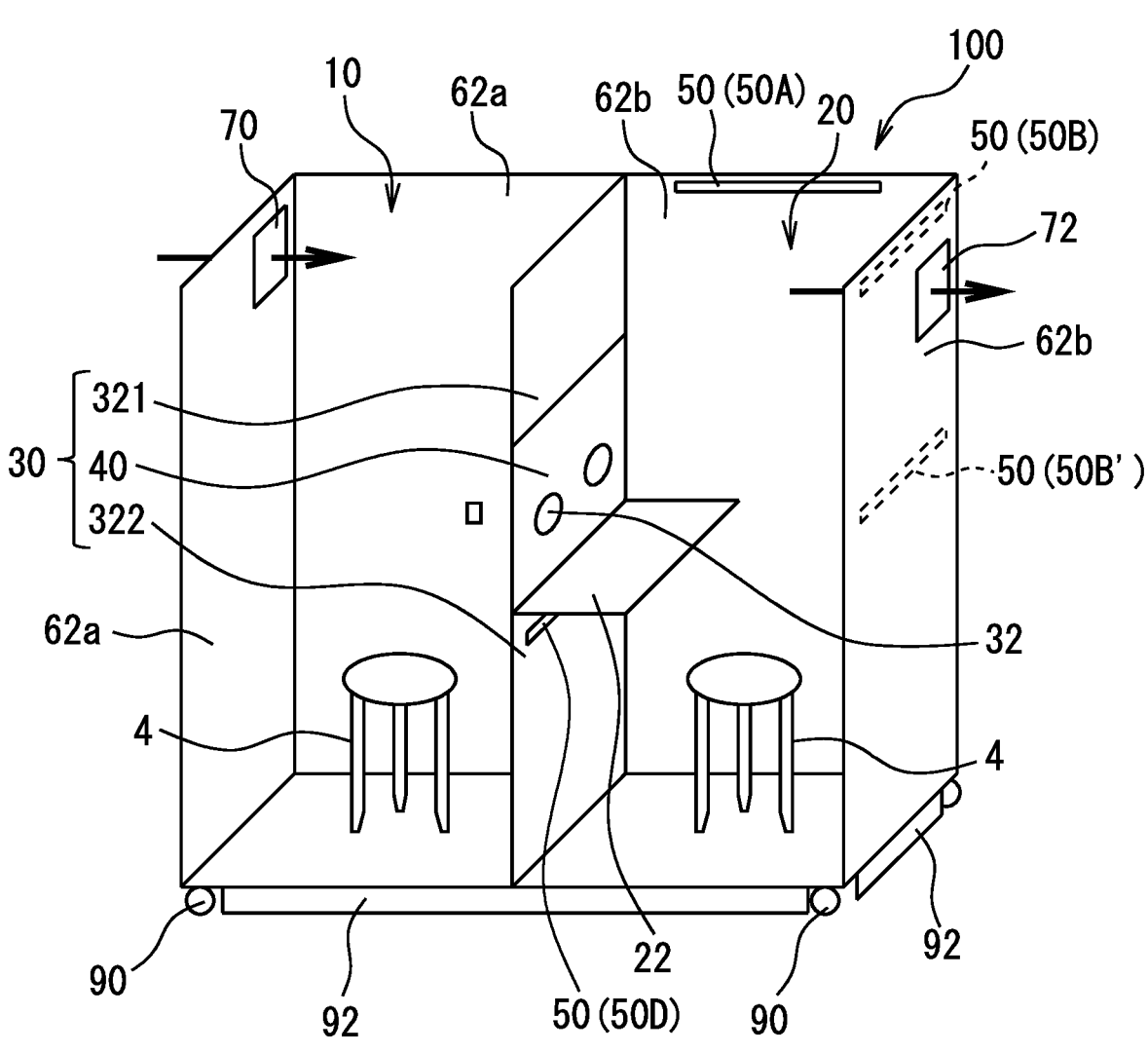
FIG. 7 is a schematic perspective view of the inside of the entire simplified examination room according to the embodiment of the present invention.

Hereinafter, a simplified examination room of the present invention will be described with reference to FIGS. 1 to 7. FIG. 1 is a schematic perspective view of the inside of an entire simplified examination room 100 according to an embodiment of the present invention. In FIG. 1, a doorway provided on the front side of the drawing and a ceiling part are not shown. FIG. 2 is a schematic perspective view of an external appearance of the simplified examination room 100. FIG. 3 is a schematic perspective view of the inside of a part of the simplified examination room 100. FIG. 3 shows that a medical worker 1 in a first booth 10 is performing a test on a patient 2 in a second booth 20 using a stick 3 for wiping the mucus. FIG. 4 is a top view of the inside of the entire simplified examination room 100. FIG. 5 is a perspective view of a partition wall 30 as viewed from the second booth 20 side. FIG. 5 shows that an arm covering body 80 is placed on a work table 22. FIG. 6 is a perspective view of the partition wall 30 as viewed from the second booth 20 side. FIG. 6 shows that the arm covering body 80 is lifted with a string 86 to expose the back side face. FIG. 7 is a schematic view of the inside of a modification of the entire simplified examination room 100 shown in FIG. 1.

Several terms used for the present invention and for the description of the present invention are defined below.

A booth refers to a space in which side faces and upper and lower faces are divided and the space is partitioned from the outside.

A patient is not limited to a person who has a disease, but includes a person who may have a disease, and widely includes a person who is subjected to an examination, a test, or treatment by a medical worker.

A droplet is a particle emitted in a patient's cough, sneeze, conversation, or the like. The droplet includes a particle containing a pathogen and moisture.

Aerosol is a microparticle that is smaller than a droplet, contains a pathogen, and floats in the air. The aerosol includes one containing moisture and a pathogen, and one containing substantially only a pathogen floating in the air when moisture is dried.

Airborne infection refers to an infection resulting from inhaling aerosol.

With regard to the present invention, unless otherwise specified, an up-down direction refers to the vertical direction in a state where the present invention is installed, and a right-left direction and a back face respectively refer to the right-left and the back face as viewed from a person facing a partition wall in each of a first booth and a second booth.

As shown in FIG. 1, the simplified examination room 100 of the present invention includes a first booth 10 and a second booth 20 provided adjacent to each other, interposing a partition wall 30 therebetween. The present embodiment is described on the assumption that the first booth 10 is a room that a medical worker enters and that the second booth 20 is a room that a patient enters.

The partition wall 30 is formed with a through hole 32 through which an arm can pass and is provided with a transparent region 40 at least at an intermediate portion in the up-down direction and at a position where the medical worker and the patient can face each other. Thus, the medical worker who has entered the first booth 10 can insert the arm into the through hole 32 and perform an examination, a test, an injection, intravenous drip, blood sampling, or other treatment (hereinafter, also simply referred to as an examination or the like) on the patient who has entered the second booth 20. The above-mentioned intravenous drip include an intravenous drip for treatment and an intravenous drip for nutritional supplementation etc.

The details of the examination are not particularly limited and include, for example, an examination in which the medical worker in the first booth 10 visually observes the patient in the second booth 20 through the transparent region 40, an examination in which palpation is performed with the arm passing through the through hole 32, an examination by remote auscultation, and the like. The remote auscultation is an examination using a digital stethoscope capable of transmitting auscultatory sound of the patient to a speaker or an earphone on the medical worker by radio, such as WiFi. More specifically, by, for example, installing a personal computer in the first booth 10 and outputting the auscultatory sound transmitted by radio from a speaker installed in the personal computer, it is possible for the medical worker in the first booth 10 to listen to the auscultatory sound.

In the present invention, the details of the above test are not particularly limited and include a polymerase chain reaction (PCR) test and the like. For example, in the second booth 20 that a patient enters, PCR test equipment or real-time PCR test equipment (hereinafter, these are collectively referred to as PCR test equipment or the like) and other devices necessary for a PCR test can be installed. In this case, it is preferable that similar treatment to deactivation treatment or killing treatment described later is also performed in the second booth 20. The medical worker in the first booth 10 can collect a specimen, such as saliva or the like, from the patient in the second booth 20 and supply the specimen to the PCR test equipment or the like installed in the second booth 20 to check whether a target gene fragment is amplified. The real-time PCR test equipment is test equipment that quantifies the DNA as a template by measuring an amplification amount by polymerase chain reaction in real time and analyzing an amplification rate thereof. The real-time PCR test equipment can provide a test result more quickly than conventional PCR test equipment that requires electrophoresis or the like. By using the real-time PCR test equipment in the simplified examination room 100 of the present invention, a test can be performed quickly and the result thereof can be provided without discharging contaminants, such as viruses or bacteria carried by the patient, from the second booth 20.

Note that, in order to make the simplified examination room 100 compact, it may be desirable to install the above PCR test equipment or the like or other analysis devices outside the simplified examination room 100. Even in this case, it is preferable that deactivation treatment or killing treatment to a specimen is performed in the simplified examination room 100.

That is, it is preferred that the medical worker in the first booth 10 immediately performs virus deactivation treatment or bacteria killing treatment on the specimen collected from the patient in the second booth 20 using equipment (not shown) installed in the second booth 20. For the virus deactivation treatment or the bacteria killing treatment, a treatment method suitable for inactivating various viruses or killing various bacteria is appropriately selected.

For example, as a specific example of the treatment, it is preferred that the medical worker in the first booth 10 collects a specimen, such as saliva, blood, or the like, from the patient in the second booth 20, transfers the specimen to a tube or the like with a disposable pipette, appropriately adds a diluent, and then performs treatment, such as heat treatment or the like. With such treatment, it is possible to inactivate the viruses or kill the bacteria in the specimen. However, the deactivation treatment or the killing treatment in the present invention is not limited thereto.

The tube or the like containing the viruses or bacteria that has been subjected to the deactivation treatment or the killing treatment and is not infectious is taken out from the second booth 20, and a test can be performed by PCR test equipment or the like installed outside the simplified examination room 100. By performing the deactivation treatment or the killing treatment on the specimen in the second booth 20 as described above, it is possible to reliably prevent the medical worker from being infected from the specimen.

Note that, the specimen collected from the patient can be stored in an active state for a certain period of time by being placed in a thermostat (not shown) installed in the second booth 20 and adjusted to an appropriate temperature. Thus, in the second booth 20, it is also possible to continuously collect specimens from a plurality of patients, store each specimen in an active state in the thermostat at an appropriate temperature, and perform deactivation treatment or killing treatment collectively or continuously after a certain number of specimens are gathered in the thermostat. For example, by raising the temperature of a plurality of specimens stored in a low-temperature thermostat to a temperature suitable for deactivation treatment or killing treatment, viruses can be deactivated or bacteria can be killed. Alternatively, a high-temperature thermostat may be provided in the second booth separately from the low-temperature thermostat, and a plurality of specimens stored in the low-temperature thermostat may be transferred to the high-temperature thermostat at the same timing to collectively perform deactivation treatment or killing treatment.

If the above intravenous drip or injection is performed in the simplified examination room 100, tools necessary for the intravenous drip or the injection, such as syringes and the like, can be installed in advance in the second booth 20 that a patient enters. For example, by performing an injection for vaccination in the simplified examination room 100, a medical worker can safely and continuously vaccinate patients. Further, when a patient diagnosed with an infectious disease receives an intravenous drip for treatment in the simplified examination room 100, the safety etc. of medical staff is similarly ensured. That is, according to the present invention, it is possible to perform the injection (for example, the vaccine injection) and the intravenous drip for treatment a large number of patients in a short time while securing the safety of medical workers.

It is also effective to collect blood from a patient in the simplified examination room 100. In this case, it is preferred to install, in the second booth 20, devices, such as a mixer, a refrigerating installation, and the like, required after blood collection.

In the simplified examination room 100 having such a configuration, the medical worker 1 and the patient 2 are in respective spaces separated by the partition wall 30 as shown in FIG. 3, and airborne infection hardly occurs. In addition, if droplets are generated due to the cough or sneeze of the patient 2, the partition wall 30 blocks the droplets to prevent the first booth 10 from being contaminated by the droplets. Thus, the medical worker 1 can safely perform an examination or the like on the patient 2. Since the through hole 32 is provided in the partition wall 30, an examination or the like can be performed in the present invention if the lower end of the partition wall 30 is brought sufficiently close to the floor part or into contact with the upper surface of the floor part without a gap.

Hereinafter, the present invention will be described in detail by exemplifying the simplified examination room 100.

As shown in FIG. 2, the simplified examination room 100 includes the first booth 10 and the second booth 20 which are rectangular parallelepiped small chambers. The first booth 10 and the second booth 20 include outer walls and respective doorways 66a and 66b, and the outer walls are constituted by installing panels 60 in a framework formed of a frame 56.

The frame 56 is appropriately constituted by a member made of metal, wood, hard resin, or the like that can maintain the strength of the simplified examination room 100.

The panels 60 constituting the outer walls of the first booth 10 and the second booth 20 constitute back face walls 62a and 62b, side face walls 64a and 64b, ceiling parts 68a and 68b, and floor parts 69a and 69b. The panel 60 at each part, the ceiling parts 68a and 68b, and the floor parts 69a and 69b may be constituted by one continuous panel 60, or may be constituted by a plurality of panels 60 in parallel.

Here, each panel 60 is a plate body that can constitute the outer walls of the first booth 10 and the second booth 20. Each panel 60 is constituted by an arbitrary member capable of maintaining an appropriate strength and is, for example, a plate body made of resin, wood, or metal, or a laminated plate body formed by laminating arbitrary members. The back face walls 62a and 62b, the side face walls 64a and 64b, the ceiling parts 68a and 68b, and the floor parts 69a and 69b may be constituted by the panels 60 made of the same member or by the panels 60 made of different members.

The size of the simplified examination room 100 including two rectangular parallelepiped small chambers is not particularly limited, but it is preferred, from the viewpoint of easy handling and not requiring a large space for installation, that the height is about 160 cm or more and 200 cm or less, the long side of the floor face is about 140 cm or more and 170 cm or less, and the short side is about 70 cm or more and 85 cm or less. Note that, the height here refers to a distance from the top surface of the floor face to the bottom surface of the ceiling face, and the long side of the floor face refers to a distance from the back face wall 62a of the first booth 10 to the back face wall 62b of the second booth 20.

The doorway 66a is a doorway for the medical worker 1 to enter and leave the first booth 10, and the doorway 66b is a doorway for the patient 2 to enter and leave the second booth 20. It is important to provide the doorways 66a and 66b individually and always keep the doorway 66a of the first booth 10 clean. In the present embodiment, as shown in FIG. 2 and FIG. 4, two doors independent from each other are installed as the doorways 66a and 66b. One door (the doorway 66a) is provided with a handle 67a, and the other door (the doorway 66b) is provided with a handle 67b in order for the medical worker 1 and the patient 2 not to grip the same handle. As other aspects, sliding doors or sheet members suspended from an upper portion may be used as the doorways 66a and 66b. From the viewpoint that proper airtightness of the first booth 10 and the second booth 20 can be maintained, it is preferable to be an aspect in which two doors independent from each other are installed as the doorways 66a and 66b.

In the present embodiment, the doorways 66a and 66b are provided at positions facing the side face walls 64a and 64b respectively. The present invention includes, as a modification, an aspect in which at least one of the doorways 66a and 66b is provided at a position corresponding to the back face wall. However, when an ultraviolet lamp 50 described later is installed, it is preferable that at least the doorway 66b is provided at a position facing the side face wall 64b.

The floor parts 69a and 69b of the first booth 10 and the second booth 20 are constituted by the panel 60 which is a plate body, and a plurality of moving wheels 90 are provided on the lower surface thereof. It is preferred that the moving wheels 90 are appropriately provided with stoppers. The simplified examination room 100 provided with the moving wheels 90 in this manner is easy to move and has good handleability. For example, the simplified examination room 100 used outdoors can be easily moved indoors at night or in rainy weather.

Between one moving wheel 90 and another moving wheel 90 adjacent thereto, a skirt 92 extending downward from the floor parts 69a and 69b is provided to make it difficult for air to flow between the lower side of the floor parts 69a and 69b and the outside.

Incidentally, all of the simplified examination room 100 constituted using the frame 56 and the panels 60 can be prepared as assembly members including the partition wall 30 described later and the like. Thus, the members constituting the simplified examination room 100 can be prepared to handle them as a simplified examination room assembly set.

That is, the present invention includes a simplified examination room assembly set including the frame 56 constituting the framework of the first booth 10 and the second booth 20, the panel 60 constituting at least one side of the ceiling parts 68a and 68b, the floor parts 69a and 69b, and the back face wall 62a and 62b, or the side face wall 64a and 64b, and the partition wall 30 partitioning the first booth 10 and the second booth 20. For example, the simplified examination room assembly set of present invention may include the frame 56, the panel 60 constituting the ceiling parts 68a and 68b, the floor parts 69a and 69b, and the partition wall 30 partitioning the first booth 10 and the second booth 20, and further includes the panel 60 constituting as least one the back face wall 62a and 62b, or the side face wall 64a and 64b. The simplified examination room assembly set may appropriately include arbitrary members of a door member constituting a doorway and joining members, such as screws and bolts, for joining the frames 56 to each other or the frame 56 to the panel 60.

According to the simplified examination room assembly set, it is possible to produce the simplified examination room 100 with a simple assembly work of assembling the framework with the frame 56 and installing the panel 60 and the like on the framework. Thus, when a large number of patients with an infectious disease or patients suspected of having an infectious disease needs to be examined separately from normal examination because of, for example, the spread of an infectious disease, it is possible to quickly increase examination rooms.

In the present embodiment, the simplified examination room in which the first booth 10 and the second booth 20 that are rectangular parallelepiped small chambers are adjacent to each other is described as an aspect, but the present invention is not limited thereto. For example, the present invention includes an aspect in which the first booth and the second booth are provided on respective sides of a self-standing partition wall 30 by dividing side faces and upper and lower faces by a sheet member made of cloth or resin and partitioning the booths from the outside.

Next, the inside of the simplified examination room 100 will be described.

The inside of the simplified examination room 100 is divided into two spaces (the first booth 10 and the second booth 20) by the partition wall 30.

The partition wall 30 is a member dividing the simplified examination room 100 from the ceiling to the floor and is preferably provided from the boundary between the ceiling parts 68a and 68b to the boundary between the floor parts 69a and 69b. By being partitioned by the partition wall 30, the flow of air between the first booth 10 and the second booth 20 is restrained. The partition wall 30 is formed with a through hole 32 through which an arm can pass. The size of the through hole 32 is not particularly limited and is only required to be a size allowing the medical worker 1 to perform an examination or the like on the patient 2 in the second booth 20 with the arm passing therethrough. In the present embodiment, two through holes 32 are provided in parallel in the right-left direction. One through hole 32 has a suitable size to insert one arm. However, as another aspect that is not shown, the through hole 32 may be one hole having a size that allows both arms to pass therethrough to perform an examination or the like.

The partition wall 30 is provided with the transparent region 40 at least at an intermediate portion in the up-down direction and at a position where the medical worker 1 in the first booth 10 and the patient 2 in the second booth 20 can face each other. The transparent region 40 may be provided over the entire partition wall 30, or above the through hole 32, or in a region including the through hole 32. In particular, it is preferable to provide the transparent region 40 in a region including the through hole 32 as shown in FIG. 1 and the like, whereby the visual field of the medical worker 1 can be sufficiently secured at the time of an examination and the like.

In the partition wall 30 in the present embodiment, the upper portion and the lower portion of the transparent region 40 are opaque regions (an upper opaque region 321 and a lower opaque region 322). In an aspect in which an ultraviolet lamp 50 described later is installed in the second booth 20, it is preferable to limit the transparent region 40 to the intermediate portion of the partition wall 30 in the up-down direction in this manner from the viewpoint of reducing the amount of ultraviolet rays with which the first booth 10 is irradiated. In the present embodiment, the width dimension of the transparent region 40 is equal to the width dimension of the partition wall 30.

The second booth 20 in the present embodiment is provided, below the through hole 32, with the work table 22 extending in the right-left direction along a plane of the partition wall 30 on the second booth 20 side. The work table 22 can be used as a table on which the medical worker 1 in the first booth 10 can place the arm passing the through hole 32 or test equipment used for a test (for example, a housing body 5 having accommodated the stick 3 shown in FIG. 3). In addition, by installing a waste container on the work table 22 although not shown, the test equipment and the like used in the second booth 20 can be discarded without being brought into the first booth 10. The installation posture of the work table 22 may be fixed, or the work table 22 may be foldably installed in such a manner as to change the plane direction from the horizontal direction to the up-down direction by providing a hinge and a stopper on the back face side.

The through hole 32 may be a simple hole as shown in FIG. 1. In this case, the medical worker 1 who has performed examination or the like by passing the arm through the through hole 32 is only required to sufficiently disinfect the arm and the palm with alcohol or the like after pull out the arm from the through hole 32. Alternatively, the medical worker 1 may perform examination or the like, wearing a disposable glove and inserting the arm into the through hole 32 and discard the glove after the examination or the like.

However, from the viewpoint of properly preventing the arm of the medical worker 1 having entered the second booth 20 from the through hole 32 from being contaminated with droplets and aerosol of the patient 2, it is preferable to provide the arm covering body 80 extending from the through hole 32 toward the second booth 20 side as shown in FIG. 3. By covering the arm inserted in the through hole 32 with the arm covering body 80, it is possible to reliably prevent droplets and aerosol of the patient 2 from adhering to the arm.

Here, the arm covering body 80 is only required to cover at least the arm inserted from the through hole 32 and may be provided with a glove portion (not shown), such as a long glove, at the distal end.

However, considering that it is difficult to perform a delicate work with a hand inserted in the attached glove portion, it is preferable that the arm covering body 80 is a cylindrical body having openings at both ends. One end (a base end opening 84) of the cylindrical body is attached to the through hole 32, and a palm can be exposed from the other end (a distal end opening 82). In this case, by wearing a disposable medical glove on the hand in advance, it is possible to prevent droplets of the patient from directly adhering to the palm. For example, by doubly wearing medical gloves in advance, exposing the palm from the distal end opening 82 of the arm covering body 80 which is the cylindrical body, removing and discarding the glove on the surface in the second booth 20 after examination or the like, pulling out the arm from the arm covering body 80 and the through hole 32 while wearing the non-contaminated inner glove, and then removing the inner glove, it is possible to more strictly prevent direct infection from the patient 2.

The member constituting the arm covering body 80 is not particularly limited, but a resin sheet or the like having appropriate flexibility, good gas barrier properties, and impermeability is suitable. In addition, a cloth made of cotton fibers, chemical fibers, or the like may be laminated on the inner side surface of the arm covering body 80 to improve the usability of a user.

The base end opening 84 of the arm covering body 80 may be firmly fixed to the through hole 32 or may be detachably attached. A means for detachably attaching the base end opening 84 is not particularly limited. For example, as shown in FIG. 5, by providing an attaching portion 81*a* on the outer edge of the through hole 32 on the first booth 10 side and an attached portion 81*b* on the outer edge of the base end opening 84 of the arm covering body 80, the attached portion 81*b* may be attached to the attaching portion 81*a*. The attaching portion 81*a* and the attached portion 81*b* may be any attachment means, such as a hook-and-loop fastener, a slide fastener, a hook, or a button.

Next, the first booth 10 will be described. The first booth 10 is a space that the medical worker 1 enters. The medical worker 1 may keep standing to perform an examination or the like on the patient 2 in the second booth 20, but usually sits in a chair 4 to perform an examination or the like. Thus, it is preferred to form the through hole 32 and the transparent region 40 provided in the partition wall 30 described above at a height for the medical worker 1 assumed to be seated.

It is desirable that the first booth 10 always maintain a clean environment. Thus, the simplified examination room 100 in the present embodiment is attached with a positive pressure device 70 in order to maintain the inside of the first booth 10 in a positive pressure state and prevent the outside air from flowing into the first booth 10. FIG. 1 specifically shows an example in which the positive pressure device 70 is attached on the upper portion of the back face wall 62*a*, but the attachment position of the positive pressure device 70 is not limited thereto. The positive pressure device 70 may be any device capable of supplying clean air to the first booth 10 and is, for example, a ventilator, a blower, a fan, or the like.

The air blown from the positive pressure device 70 flows into the second booth 20 through the through hole 32. In addition, if a large amount of air is supplied, the air may leak to the outside from a gap between the members constituting the first booth 10. In any case, unintended air from the adjacent second booth 20 and the outside does not flow into the first booth 10 in which a pressure higher than that of the outside (including the second booth 20) is maintained, and a clean environment of the first booth 10 is maintained. Thus, the medical worker 1 who enters the first booth 10 and performs an examination or the like is properly prevented from being infected with air by aerosol generated by the patient 2 having entered the second booth 20.

Next, the second 20 booth will be described. The second booth 20 is a space that the patient 2 enters. Similarly to the medical worker 1, the patient 2 sits in another chair 4 and receives examination or the like from the medical worker 1 who has entered the first booth 10.

The second booth is highly likely to be contaminated with air because an infected patient or a patient suspected of being infected enters. Thus, the simplified examination room 100 in the present embodiment is attached with a negative pressure device 72 in order for the inside of the second booth 20 to be in a negative pressure state and for the contaminated air not to leak to the outside. FIG. 1 specifically shows an example in which the negative pressure device 72 is attached on the upper portion of the back face wall 62*b*, but the attachment position of the negative pressure device 72 is not limited thereto. The negative pressure device 72 may be any device capable of causing the air in the second booth 20 to flow to the outside in order to make the inside have a negative pressure and is, for example, a ventilator, a blower, a fan, or the like. Note that, since the negative pressure device 72 causes the air that may be contaminated to flow to the outside, it is preferable to attach a filter or the like capable of capturing viruses or the like. Examples of the above filters include, but are not limited to, High Efficiency Particulate Air Filter (HEPA filter) and Ultra Low Penetration Air Filter (ULPA filter) as specified in JIS Z 8122. For example, if a HEPA filter is used as the above filter, the air contaminated by the virus in the second booth 20 can be replaced with clean air in around 4 minutes without spreading the contaminated air outside the booth.

As described above, the simplified examination room 100 including the positive pressure device 70 in the first booth 10 and the negative pressure device 72 in the second booth 20 can maintain the pressure in the first booth 10 higher than the pressure in the second booth 20. Thus, it is possible for gas (air) to always flow from the first booth 10 side to the second booth 20 side and for the medical worker 1 in the first booth 10 to be properly prevented from being infected by the contaminated air inside the second booth 20.

In the case of using the arm covering body 80 including the distal end opening 82, it is generally necessary to sufficiently disinfect the vicinity of the base end opening 84 of the arm covering body 80 with alcohol or the like in order for viruses or the like not to enter the inside of the first booth 10 from the opening. However, in the aspect in which air always flows from the first booth 10 to the second booth 20 as described above, air flows from the base end opening 84 of the arm covering body 80 to the distal end opening 82. Thus, it is possible to properly prevent viruses and the like from entering the first booth 10 side from the distal end opening 82.

Incidentally, although the first booth 10 is maintained at a positive pressure and the second booth 20 is maintained at a negative pressure, this pressure state may change when the doorways 66a and 66b are opened and closed. That is, when the doorway 66b of the second booth 20 maintained at a negative pressure is opened, the second booth 20 can be at a positive pressure for a moment due to the inflow of the outside air. In addition, when the doorway 66a of the first booth 10 maintained at a positive pressure is opened, the inside air flows out to the outside of the first booth 10, and the first booth 10 can be at a negative pressure for a moment. In such a case, air movement between the first booth 10 and the second booth 20 through the through hole 32 can occur. In order to prevent the air movement described above, it is preferable that a sealing means for directly or indirectly sealing the through hole 32 is provided in the first booth 10. The sealing means is, for example, a sealing cap which is provided on the first booth 10 side and can be fitted in the through hole 32 as shown in FIG. 5. In the present embodiment, the sealing cap may be suspended by, for example, a suspension string attached to the partition wall 30 on the first booth 10 side. By sealing the through hole 32 with the sealing means (the sealing cap) before opening and closing the doorways 66a or 66b of the first booth 10 or the second booth 20, it is possible to prevent the air movement described above. The sealing means may be a means for indirectly sealing the through hole 32 by closing an arbitrary position of the arm covering body 80 attached to the through hole 32 although this is not shown.

As described above, in the simplified examination room 100 in the present embodiment, various precautions in order for the medical worker 1 in the first booth 10 not to be infected from the patient 2 in the second booth 20 are taken into consideration.

Incidentally, if an infectious disease spreads, the medical worker 1 has to perform an examination or the like on a plurality of patients. In this case, a plurality of patients 2 enters the second booth 20 by turns. Thus, it is necessary to prevent a patient 2 who enters the room later from being contact-infected by touching the inside of the second booth 20 contaminated with droplets or the like of a patient who has received an examination or the like earlier.

For example, when one patient 2 enters the second booth 20 and receives an examination or the like, viruses or bacteria highly possibly adhere to the partition wall 30, the work table 22, the floor part 69b, the doorway 66b, and the like on the second booth 20 side. Thus, after the patient 2 leaves the second booth 20, it is necessary to carefully disinfect the inside of the second booth 20 with a disinfectant, such as alcohol, to make the inside clean. In this condition, if the next patient 2 enters the second booth 20, it is possible to avoid infection from the patient 2 who has received an examination or the like earlier.

However, the work for disinfecting the second booth 20 after each examination or the like takes a lot of labor and time and hinders quick examination or the like for a plurality of patients. In addition, a person who performs the disinfection work (hereinafter, also referred to as a disinfection worker) must perform the disinfection work in complete protective clothing, and which causes large mental and physical fatigue and can increase the consumption amount of the completely protective clothing. Furthermore, if disinfection is started immediately after the patient 2 leaves the second booth 20, the disinfection worker can be infected with air by inhaling the contaminated air (aerosol) inside the second booth 20. Thus, the disinfection worker has to wait for a while until the air inside the second booth 20 is replaced with clean air by the negative pressure device 72 or the like to perform cleaning, and which also hinders quick examination or the like for a plurality of patients.

In contrast, the simplified examination room 100 in the present embodiment is provided with an ultraviolet lamp 50 in the second booth 20, and the inside of the second booth 20 can be irradiated with ultraviolet rays at an arbitrary timing. With the irradiation, it is possible to kill bacteria and to inactivate viruses inside the second booth 20, and to omit alcohol disinfection that has been conventionally performed. Thus, unlike the conventional case, it is neither necessary to take labor of a disinfection worker nor to wear complete protective clothing for disinfection of the second booth 20. Therefore, by installing the ultraviolet lamp 50, the expected purpose of the present invention that an examination or the like is safely performed is more sufficiently achieved, and it is possible to quickly perform the examination or the like on a plurality of patients.

In addition, it is also known that oxygen in the air is changed into ozone by irradiation with the ultraviolet lamp 50. Thus, it is preferred, in the second booth 20 that is the small chamber constituted by the partition wall 30, the side face wall 64b, the back face wall 62b, the doorway 66b, the ceiling part 68b, and the floor part 69b, that these members constituting the small chamber are brought into close contact with each other in such a manner that gaps therebetween are not visually confirmed in order to have a high sealing property and that the small chamber is irradiated with the ultraviolet lamp 50. Accordingly, ozone generated by the irradiation with the ultraviolet lamp 50 is retained in the second booth 20 except for being discharged by the negative pressure device 72. Thus, it is possible to obtain, in addition to the action of the ultraviolet ray itself, the ozone sterilization effect and the virus inactivation effect and to further shorten the time for cleaning the inside of the second booth 20.

The ultraviolet lamp 50 can be directly attached on the inner surface or the like of the second booth 20, but it is desirable that a specular reflector (a specular reflection sheet 54) is installed on the inner surface of the second booth 20 and the ultraviolet lamp 50 is installed thereon as shown in FIG. 1. Thus, it is possible to specularly reflect ultraviolet rays to obtain a higher ultraviolet irradiation effect. Although not shown, the ultraviolet lamp 50 provided in the second booth 20 may be a stand type that can stand on its own.

The ultraviolet lamp 50 is a light source capable of emitting ultraviolet rays. Specifically, the ultraviolet lamp 50 is a fluorescent ultraviolet lamp, an LED ultraviolet lamp, or the like. In addition, an ultraviolet lamp using xenon as a light source to generate xenon ultraviolet rays or pulsed xenon ultraviolet rays is also effective for inactivation of viruses and the like. The shape of the ultraviolet lamp 50 is not particularly limited, and may be a long ultraviolet lamp 50 as shown in the drawing or may be a spherical ultraviolet lamp 50 (not shown). The ultraviolet ray used herein refers to an electromagnetic wave having a wavelength of 10 nm or more and 400 nm or less. From the viewpoint of a high effect of killing bacteria and inactivating viruses, ultraviolet rays having a wavelength of 10 nm or more and 280 nm or less are preferable, ultraviolet rays having a wavelength of 100 nm or more and 280 nm or less are more preferable, and ultraviolet rays having a wavelength of 200 nm or more and 280 nm or less are still more preferable.

It is preferred to install a switch 52 of the ultraviolet lamp 50 at an arbitrary position other than the inside of the second booth 20. For example, as shown in FIG. 3, it is preferred to provide the switch 52 in the first booth 10. The medical worker 1 inside the first booth 10 can confirm that the patient 2 has left the second booth 20, promptly turn on the switch 52 to start irradiation with ultraviolet rays, and turn off the switch 52 after a predetermined time has elapsed to promptly accept the next patient in the second booth 20. In this case, it is preferable that the partition wall 30 is constituted by the transparent region 40 formed of an ultraviolet attenuating member and the opaque regions (the upper opaque region 321 and the lower opaque region 322) provided above and below the transparent region 40. By providing the partition wall 30 described above, it is possible to minimize the amount of ultraviolet rays reaching the first booth 10 when the ultraviolet lamp 50 installed in the second booth 20 is turned on. Thus, it is possible for the medical worker 1 to turn on or off the ultraviolet lamp 50 while staying in the first booth 10 and to be freed from the trouble of going in and out of the first booth 10 every time of irradiation with ultraviolet rays.

The ultraviolet attenuating member is only required to be a member having a function of attenuating ultraviolet rays while securing transparency. The ultraviolet attenuating member is, for example, an appropriate thickness or of a transparent plate body (more specifically, an acrylic resin plate or the like) or member obtained by sticking a transparent ultraviolet absorbing film to the surface of a transparent plate body formed of an arbitrary member. Instead of the ultraviolet attenuating member constituting the transparent region 40, a curtain or a door that can be opened and closed to cover the transparent region 40 may be provided to the partition wall 30 on the first booth 10 side.

In order to more efficiently irradiate the inside of the second booth 20 with ultraviolet rays in a shorter time to kill bacteria or inactivate viruses, the following aspect is preferable.

That is, as shown in FIG. 4, the second booth 20 in the present embodiment is a rectangular parallelepiped small chamber including the back face wall 62*b* facing the partition wall 30, the side face wall 64*b* provided on either of the left or right side connecting the partition wall 30 with the back face wall 62*b*, the doorway 66*b* provided on a plane facing the side face wall 64*b*, the ceiling part 68*b*, and the floor part 69*b*. In the second booth 20, the plane of the partition wall 30 on the second booth 20 side facing the face of the patient 2 and the doorway 66*b* that the patient 2 directly touches to open and close are most likely to be contaminated by the patient 2 and become a contaminated surface. Thus, in the second booth 20 which is the rectangular parallelepiped small chamber, it is preferred to install long ultraviolet lamps (a back-face ultraviolet lamp 50B and a side-face ultraviolet lamp 50A) extending in respective directions parallel to the plane directions of the partition wall 30 and the doorway 66*b*. By disposing the long ultraviolet lamps extending in the respective directions parallel to the plane directions of the contaminated surfaces, ultraviolet rays are incident on the contaminated surface at a straight line or at an angle close to a straight line, whereby a higher sterilization effect and virus inactivation effect can be obtained (see FIG. 4).

In addition, from the study of the inventor, it has been found that the distance between the ultraviolet lamp 50 and the contaminated surface also greatly affects the ultraviolet irradiation effect. More specifically, in the second booth 20, it is preferable that the back face wall 62*b* and the side face wall 64*b* are provided with respective ultraviolet lamps 50 (the back-face ultraviolet lamp 50B and the side-face ultraviolet lamp 50A) and that the distance between the contamination center of the partition wall 30 and the center of the ultraviolet lamp 50 (the back-face ultraviolet lamp 50B) provided on the back face wall 62*b* and the distance between the contamination center of the doorway 66*b* and the center of the ultraviolet lamp 50 (the side-face ultraviolet lamp 50A) provided on the side face wall 64*b* each are 50 cm or more and 100 cm or less.

Here, the contamination center of the partition wall 30 refers to a point on the partition wall 30 that is 10 cm above the half point of a straight line connecting the centers of the two through holes 32, and the contamination center of the doorway 66*b* refers to the handle 67*b* provided on the indoor side of the doorway 66*b* for opening and closing. The center of each ultraviolet lamp 50 refers to a point at the half of the long ultraviolet lamp 50 in the length direction. If the ultraviolet lamps 50 are a plurality of spherical lamps and are arranged in one direction, all of the arranged spherical lamps are regarded as one ultraviolet lamp 50, and a point at the half from one end to the other end is set as the center of the ultraviolet lamp 50.

By setting the distance between each ultraviolet lamp 50 and the contaminated surface to 50 cm or more and 100 cm or less, it is possible to obtain a very high ultraviolet irradiation effect and to make the inside of the second booth 20 clean in a short time (for example, about 1 minute to 10 minutes). As a result, it is possible to complete irradiation with ultraviolet rays in a short time and to speed up the rotation of an examination or the like.

As described above, it is preferable that each ultraviolet lamp 50 is installed in the second booth 20 to have the above distance of 50 cm or more and 100 cm or less. In other words, the dimensions of the second booth 20 are preferred to be designed to secure the above distance.

More specifically, in the second booth 20 which is the rectangular parallelepiped small chamber, the ultraviolet lamps 50 (the back-face ultraviolet lamp 50B and the side-face ultraviolet lamp 50A) can be disposed in, for example, respective intermediate regions of the back face wall 62*b* and the side face wall 64*b* in the up-down direction as shown in FIG. 1. In such an installation aspect, the distance of the above numerical range can be easily secured, and the ultraviolet irradiation efficiency is high.

As another aspect, as shown in FIG. 7, the back-face ultraviolet lamp 50B may be installed along the upper end of the back face wall 62*b*, and the side-face ultraviolet lamp 50A may be similarly installed along the upper end of the side face wall 64*b*. By installing the ultraviolet lamps 50 at upper portions in this manner, it is possible to prevent the ultraviolet lamps 50 from being damaged by coming into contact with a person or an object. In addition, if the ultraviolet lamps 50 are provided at the upper portions in this manner, the distance of the above numerical range can be sufficiently secured. The side-face ultraviolet lamp 50A may be provided on the ceiling part 68*b* along the upper end of the side face wall 64*b*, and the back-face ultraviolet lamp 50B may be provided on the ceiling part 68*b* along the upper end of the back face wall 62*b*. In FIG. 7, another ultraviolet lamp 50 (a back-face ultraviolet lamp 50B') is further provided on the back face wall 62*b* at a position facing the transparent region 40 to enable more sufficient sterilization or virus inactivation on the surface of the partition wall 30.

Naturally, when the ultraviolet lamps 50 are installed securing the distance within the above numerical range, it is needless to say that not only the contaminated surface but also the inside of the entire second booth 20 is cleaned by ultraviolet rays.

In addition to the ultraviolet lamps 50 installed at the position facing the contaminated surfaces as described above, an ultraviolet lamp 50 may be installed at another arbitrary position. For example, a center ultraviolet lamp 50C may be installed in the upper opaque region 321 of the partition wall 30 as shown in FIG. 1, an ultraviolet lamp 50 may be installed on the ceiling part 68*b* (not shown), or an ultraviolet lamp 50 (an ultraviolet lamp 50D under the work table) may be installed under the work table 22 as shown in FIG. 7.

When the doorway is provided on the back face side in the second booth 20, it is difficult to install the ultraviolet lamp 50 at the position facing the contaminated surface (the handle 67*b*) as described above. Thus, from the viewpoint of securing an effective installation position of the ultraviolet lamp 50, it is preferable the doorway 66*b* is provided at a position facing the side face wall 64*b*.

In addition, it is preferred that the arm covering body 80 is also irradiated with ultraviolet rays to be cleaned while the second booth 20 is irradiated with the ultraviolet rays. For example, as shown in FIG. 5, during the irradiation with ultraviolet rays, the upper face side of the arm covering body 80 exposed by placing the arm covering body 80 on the work table 22 is properly irradiated with the ultraviolet rays. In addition, an end of the string 86 may be attached to an arbitrary position (in the drawings, at the distal end opening 82) of the arm covering body 80, and the string 86 may be put through a small hole 88 provided in the partition wall 30 above the through hole 32 in advance. By pulling the string 86 from the first booth 10 side, the back face side of the arm covering body 80 can be exposed as shown in FIG. 6. By irradiating ultraviolet rays in this state, it is possible to properly irradiate the back face side of the arm covering body with ultraviolet rays. The arm covering body 80 is closest to the patient 2 at the time of performing an examination or the like, and droplets highly possibly adhere thereto. Thus, it is preferable that not only the upper face side of the arm covering body 80 but also the back face side of the arm covering body 80 can be cleaned as described above.

The simplified examination room 100 which is an embodiment of the present invention has been described above, but the present invention is not limited thereto. For example, a specific configuration shown in each drawing may be changed or added to another aspect shown in other drawings, and a plurality of spherical ultraviolet lamps may be disposed in one direction instead of the long ultraviolet lamps.

When the long ultraviolet lamps are disposed, one ultraviolet lamp may be disposed on each wall face, or two or more ultraviolet lamps may be disposed.

In addition, other configurations necessary for performing an examination, a test, an injection, blood sampling, other treatment, and the like using the simplified examination room of the present invention may be appropriately added.

For example, an indoor light (not shown) may be provided in the first booth and/or the second booth.

In the simplified examination room of the present invention, an outlet can be appropriately provided in each of the first booth and the second booth. The outlet includes one for securing a power source for test equipment, a personal computer, and the like, but is not limited thereto. For example, the simplified examination room of the present invention may be provided with air conditioning equipment for controlling the temperature in the booths. In this case, the power source of the air conditioning equipment may be provided as a power source dedicated to the air conditioning equipment in order to secure a sufficient electric capacity.

The above embodiment includes the following technical ideas.

(1) A simplified examination room including:

a first booth and a second booth provided adjacent to each other, interposing a partition wall between the first booth and the second booth, in which the partition wall is formed with a through hole allowing an arm to pass through and is provided, at least at an intermediate portion of the partition wall in an up-down direction, with a transparent region allowing a person having entered the first booth and a person having entered the second booth to face each other.

(2) The simplified examination room according to (1), in which the second booth is provided with an ultraviolet lamp.

(3) The simplified examination room according to (2), in which the first booth is provided with a switch of the ultraviolet lamp, and the transparent region of the partition wall is formed of an ultraviolet attenuating member.

(4) The simplified examination room according to (2) or (3), in which the second booth is a rectangular parallelepiped small chamber including a back face wall facing the partition wall, a side face wall provided on either of a left side or a right side connecting the partition wall with the back face wall, a doorway provided on a plane facing the side face wall, a ceiling part, and a floor part, and the second booth is provided with a long ultraviolet lamp extending in a direction parallel to a plane direction of each of the partition wall and the doorway.

(5) The simplified examination room according to any one of (2) to (4), in which the second booth is a rectangular parallelepiped small chamber including a back face wall facing the partition wall, a side face wall provided on either of a left side or a right side connecting the partition wall with the back face wall, a doorway provided on a plane facing the side face wall, a ceiling part, and a floor part, the second booth is provided with an ultraviolet lamp on each of the back face wall and the side face wall, and a distance between a contamination center of the partition wall and a center of the ultraviolet lamp provided on the back face wall and a distance between a contamination center of the doorway and a center of the ultraviolet lamp provided on the side face wall each are 50 cm or more and 100 cm or less.

(6) The simplified examination room according to any one of (1) to (5), in which the first booth includes a positive pressure device, the second booth includes a negative pressure device, and pressure in the first booth is maintained to be higher than pressure in the second booth.

(7) The simplified examination room according to any one of (1) to (6), in which an arm covering body extending from the through hole toward the second booth side is provided.

(8) The simplified examination room according to (7), in which the arm covering body is a cylindrical body having openings at both ends.

(9) The simplified examination room according to (1), in which the first booth is provided with a sealing means for preventing air from moving between the first booth and the second booth through the through hole.

(10) The simplified examination room according to any one of (1) to (9), in which the second booth is provided, below the through hole, with a work table extending in a right-left direction along a plane of the partition wall on the second booth side.

(11) A simplified examination room assembly set for producing the simplified examination room according to any one of (1) to (10), the simplified examination room assembly set including:

a frame constituting a framework of the first booth and the second booth;

a panel constituting at least one side of a ceiling part, a floor part, and a side face wall, or a back face wall; and a partition wall partitioning the first booth and the second booth.

What is claimed is:

1. A simplified examination room comprising:

a first booth and a second booth provided adjacent to each other, interposing a partition wall between the first booth and the second booth, wherein the partition wall is formed with a through hole allowing an arm to pass through and is provided, at least at an intermediate portion of the partition wall in an up-down direction, with a transparent region allowing a person having entered the first booth and a person having entered the second booth to face each other, the second booth is provided with an ultraviolet lamp on a back face wall, and a distance between a contamination center of the partition wall and a center of the ultraviolet lamp provided on the back face wall is 50 centimeters or more and 100 centimeters or less.

2. The simplified examination room according to claim 1, wherein the first booth is provided with a switch of the ultraviolet lamp, and the transparent region of the partition wall is formed of an ultraviolet attenuating member.

3. The simplified examination room according to claim 1, wherein the second booth is a rectangular parallelepiped small chamber including the back face wall facing the partition wall, a side face wall provided on either of a left side or a right side connecting the partition wall with the back face wall, a doorway provided on a plane facing the side face wall, a ceiling part, and a floor part, and the ultraviolet lamp is a long ultraviolet lamp extending in a direction parallel to a plane direction of each of the partition wall and the doorway.

4. The simplified examination room according to claim 1, wherein the second booth is a rectangular parallelepiped small chamber including the back face wall facing the partition wall, a side face wall provided on either of a left side or a right side connecting the partition wall with the back face wall, a doorway provided on a plane facing the side face wall, a ceiling part, and a floor part, the second booth is further provided with an ultraviolet lamp on the side face wall, and a distance between a contamination center of the doorway and a center of the ultraviolet lamp provided on the side face wall is 50 centimeters or more and 100 centimeters or less.

5. The simplified examination room according to claim 1, wherein the first booth includes a positive pressure device, the second booth includes a negative pressure device, and pressure in the first booth is maintained to be higher than pressure in the second booth.

6. The simplified examination room according to claim 1, wherein an arm covering body extending from the through hole toward the second booth side is provided.

7. The simplified examination room according to claim 6, wherein the arm covering body is a cylindrical body having openings at both ends.

8. The simplified examination room according to claim 1, wherein the first booth is provided with a sealing means for preventing air from moving between the first booth and the second booth through the through hole.

9. The simplified examination room according to claim 1, wherein the second booth is provided, below the through hole, with a work table extending in a right-left direction along a plane of the partition wall on the second booth side.

10. A simplified examination room assembly set for producing the simplified examination room according to claim 1, the simplified examination room assembly set comprising:

a frame constituting a framework of the first booth and the second booth;

a panel constituting at least one side of a ceiling part, a floor part, and a side face wall, or the back face wall; and the partition wall partitioning the first booth and the second booth.

11. A simplified examination room comprising:

a first booth and a second booth provided adjacent to each other, interposing a partition wall between the first booth and the second booth, wherein the partition wall is formed with a through hole allowing an arm to pass through and is provided, at least at an intermediate portion of the partition wall in an up-down direction, with a transparent region allowing a person having entered the first booth and a person having entered the second booth to face each other, the second booth is provided with an ultraviolet lamp on a side face wall, a distance between a contamination center of a doorway of the second booth and a center of the ultraviolet lamp provided on the side face wall is 50 centimeters or more and 100 centimeters or less.

12. The simplified examination room according to claim 11, wherein the second booth is further provided with an ultraviolet lamp on a back face wall, and a distance between a contamination center of the partition wall and a center of the ultraviolet lamp provided on the back face wall is 50 centimeters or more and 100 centimeters or less.

13. The simplified examination room according to claim 11, wherein the first booth is provided with a switch of the ultraviolet lamp, and the transparent region of the partition wall is formed of an ultraviolet attenuating member.

14. The simplified examination room according to claim 11, wherein the second booth is a rectangular parallelepiped small chamber including a back face wall facing the partition wall, the side face wall provided on either of a left side or a right side connecting the partition wall with the back face wall, the doorway provided on a plane facing the side face wall, a ceiling part, and a floor part, and the ultraviolet lamp is a long ultraviolet lamp extending in a direction parallel to a plane direction of each of the partition wall and the doorway.

15. The simplified examination room according to claim 11, wherein the first booth includes a positive pressure device, the second booth includes a negative pressure device, and pressure in the first booth is maintained to be higher than pressure in the second booth.

16. The simplified examination room according to claim 11, wherein an arm covering body extending from the through hole toward the second booth side is provided.

17. The simplified examination room according to claim 16, wherein the arm covering body is a cylindrical body having openings at both ends.

18. The simplified examination room according to claim 11, wherein the first booth is provided with a sealing means for preventing air from moving between the first booth and the second booth through the through hole.

19. The simplified examination room according to claim 11, wherein the second booth is provided, below the through hole, with a work table extending in a right-left direction along a plane of the partition wall on the second booth side.

20. A simplified examination room assembly set for producing the simplified examination room according to claim 11, the simplified examination room assembly set comprising:

a frame constituting a framework of the first booth and the second booth;

a panel constituting at least one side of a ceiling part, a floor part, and the side face wall, or a back face wall; and the partition wall partitioning the first booth and the second booth.

* * * * *